United States Patent [19]
Nakamura

[11] Patent Number: 5,422,060
[45] Date of Patent: Jun. 6, 1995

[54] METHOD OF OPENING AND CLOSING MOLDS OF INJECTION MOLDING MACHINES

[75] Inventor: Nobuyuki Nakamura, Nagano, Japan

[73] Assignee: Nissei Plastic Industrial Co., Ltd., Nagano, Japan

[21] Appl. No.: 203,482

[22] Filed: Feb. 28, 1994

Related U.S. Application Data

[63] Continuation of Ser. No. 13,408, Feb. 4, 1993, abandoned.

[30] Foreign Application Priority Data

Feb. 5, 1992 [JP] Japan .................. 4-054206

[51] Int. Cl.$^6$ ............................ B29C 45/67
[52] U.S. Cl. .................. 264/328.1; 425/590; 425/451.2
[58] Field of Search .......... 264/328.1, 328.11; 425/589, 590, 595, 450.1, 451.2, 451.9; 92/255

[56] References Cited

U.S. PATENT DOCUMENTS

| | | | |
|---|---|---|---|
| 3,426,657 | 2/1969 | Bimba | 92/255 |
| 3,807,285 | 4/1974 | Phillips | 92/255 |
| 3,935,791 | 2/1976 | Hehl | 425/451.2 |
| 4,021,181 | 5/1977 | Hehl | 425/450.1 |
| 4,069,747 | 1/1978 | Forry et al. | 92/255 |
| 4,111,629 | 9/1978 | Nussbaumer | 425/450.1 |
| 4,128,380 | 12/1978 | Jamann | 425/450.1 |
| 4,815,360 | 3/1989 | Winterle | 92/255 |
| 5,051,087 | 9/1991 | Huang | 425/450.1 |

FOREIGN PATENT DOCUMENTS

| | | | |
|---|---|---|---|
| 2949675 | 6/1981 | Germany | 92/255 |
| 53-6668 | 3/1978 | Japan . | |
| 62-22348 | 6/1987 | Japan . | |

Primary Examiner—Jill L. Heitbrink

[57] ABSTRACT

A mold clamping apparatus for injection molding machines includes a stationary plate 2 for supporting a stationary mold Cc; a moving plate 6 for supporting a moving mold Cm; a plurality of parallel tie bars 3a, 3b, 3c, and 3d of which end portions are secured to the stationary plate 2; a plurality of different cylinders 4a–4d . . . which accommodate piston sections 5a, 5b, 5c, and 5d set at the middle of each tie bar, and arranged movably along the tie bars and integrally with the movable plate; and a hydraulic circuit 7 capable of selective feeding of pressurized oil to the oil chambers of the cylinders. The piston sections of different cylinders are formed in different diameters and all portions of all tie bars are formed in the same diameter.

3 Claims, 5 Drawing Sheets

FIG.5

|  |  | HIGH SPEED MOLD CLOSING | LOW SPEED MOLD CLOSING | HIGH-POWER MOLD CLOSING | HIGH-POWER MOLD OPENING | HIGH SPEED MOLD OPENING | LOW SPEED MOLD OPENING |
|---|---|---|---|---|---|---|---|
| V1 | a |  |  |  | ON | ON | ON |
|  | b | ON | ON | ON |  |  |  |
| V2 | a |  |  | ON | ON |  |  |
|  | b | ON | ON |  |  | ON | ON |
| V3 | a |  |  | ON | ON |  |  |
|  | b | ON | ON |  |  | ON | ON |
| Vr |  | O | ON | O | O | O | ON |

METHOD OF OPENING AND CLOSING MOLDS OF INJECTION MOLDING MACHINES

This application is a continuation, of application Ser. No. 08/013,408, filed on Feb. 4, 1993, now abandoned.

BACKGROUND OF THE INVENTION

1. Field of the Invention

The present invention relates to a mold clamping apparatus for injection molding machines, in which a tie bar for movably supporting a movable plate is provided with a clamping cylinder.

2. Description of the Relevant Art

A mold clamping apparatus for injection molding machines is known which has: a stationary plate; a plurality of parallel tie bars of which one end portion is secured to the stationary plate; a plurality of different cylinders accommodating a piston section set at the middle of each tie bar respectively, and are movable along the tie bars; a movable plate integrated with each cylinder; and a hydraulic circuit for selectively feeding pressurized oil to the oil chamber of each cylinder; whereby various mold opening/closing speeds or various mold opening/closing forces can be selected.

For example, the official gazette of Japanese patent publication No. 53-6668 discloses a mold clamping apparatus having a cylinder in which the diameter of the one side of the tie bar differs from the diameter of the other side of the tie bar, wherein a piston section set at the middle of the tie bar serves as a boundary between the two sides, so that the pressure area of each piston section differs.

The official gazette of Japanese utility model publication No. 62-22348 discloses a mold clamping apparatus in which the diameter of a tie bar and that of a piston section set at the middle of the tie bar are made different from each other in different cylinders, so that the pressure area of each piston section differs. For this mold clamping apparatus, two of four cylinders are made as rapid traverse cylinders for performing high-speed movement, and the other two cylinders are made as clamping cylinders for performing high-power clamping, and are made to operate independently. Therefore, the diameter of each tie bar is set so as to be suitable for the particular cylinder function.

However, the existing mold clamping apparatus requires various types of tie bars because each pressure area is set by varying the diameter of each tie bar. Therefore, increased man-hours for machining of tie bars and assembling them with piston sections and the like leads to greatly increased manufacturing cost.

Moreover, because tie bars with different diameters may become mixed, problems may arise with the balance, uniformity, and stability of the clamping force throughout the whole mold clamping control. For example, tie bars with small diameter are easily distorted, and may degrade the quality of products and the accuracy of control.

SUMMARY OF THE INVENTION

It is an object of the present invention to provide a mold clamping apparatus for injection molding machines capable of greatly decreasing the man-hours required for machining of tie bars and for assembling them with piston sections, improving the assembly performance, and decreasing the manufacturing cost by using common tie bars or the same type of tie bars.

It is another object of the present invention to provide a mold clamping apparatus for injection molding machines capable of improving the balance, uniformity, and stability of the clamping force and also improving the quality of products and control accuracy by using the same tie bars.

To achieve the above objects, the present invention is characterized in that a mold clamping apparatus 1 for injection molding machines as shown in FIGS. 1 and 4 is made by providing a stationary plate 2 for supporting a stationary mold Cc; a movable plate 6 for supporting a movable mold Cm; a plurality of parallel tie bars 3a, 3b, 3c, and 3d having end portions secured to the stationary mold 2; a plurality of different cylinders 4a and 4d which accommodate piston sections 5a, 5b, 5c, and 5d set at the middle of tie bars 3a-3d respectively, and are arranged movably along the tie bars 3a-3d and integrally with a moving plate 6; and a hydraulic circuit 7 capable of feeding pressurized oil to the oil chambers of cylinders 4a-4d selectively; piston sections 5a and 5d (5c and 5b) of different cylinders 4a and 4d (4c and 4b) are formed with differing diameters, and all tie bars 3a-3d of all portions are formed with the same diameter.

In this case, it is preferable to provide four tie bars 3a, 3b, 3c, and 3d, the end portions of which are secured to four corners of the stationary plate 2 respectively, to form the piston sections 5a and 5b (5c and 5d) of tie bars 3a and 3b (3c and 3d) located on a diagonal line and having the same diameter, and to form, for example, the piston sections 5a and 5d of adjacent tie bars 3a and 3d in different diameters. Moreover, it is preferable to provide the tie bars 3a-3d with the piston securing sections 8a-8d for securing the piston sections 5a-5d at the middle of the tie bars, respectively, and to form the piston sections 5a-5d into cylindrical ones having hollow sections 9a-9d where the tie bars 3a-3d are inserted. The same can be realized even if the stationary plate 2 and the movable plate 6 are reversed.

Therefore, it is enough to prepare one type of tie bar usable for all tie bars 3a in common. For example, when a total of four tie bars is necessary, it is sufficient to prepare four of the same tie bars (3a). Moreover, the pressure areas of the cylinders 4a can be changed by changing the diameter of each of piston sections 5a, because the diameters of the tie bars 3a are constant. For example, when the piston sections 5a and 5d are formed with a different diameter, the cylinders 4a and 4d with different pressure areas can be obtained.

On the other hand, if the piston sections 5a-5d are made into cylindrical ones having hollow sections 9a-9d where tie bars 3a-3d are inserted respectively, and the piston securing sections 8a-8d for securing the piston sections 5a at the middle of tie bars 3a are provided respectively, tie bars 3a can be inserted into the hollow sections 9a of the piston sections 5a and the piston sections 5a can be secured to the piston securing sections 8a. Thereby, the piston sections 5a can be easily assembled and they become as one body by the assembling.

BRIEF DESCRIPTION OF THE DRAWINGS

FIG. 5 is a control matrix diagram of each selector valve; and

DETAILED DESCRIPTION OF THE PREFERRED EMBODIMENTS

Figure 1:
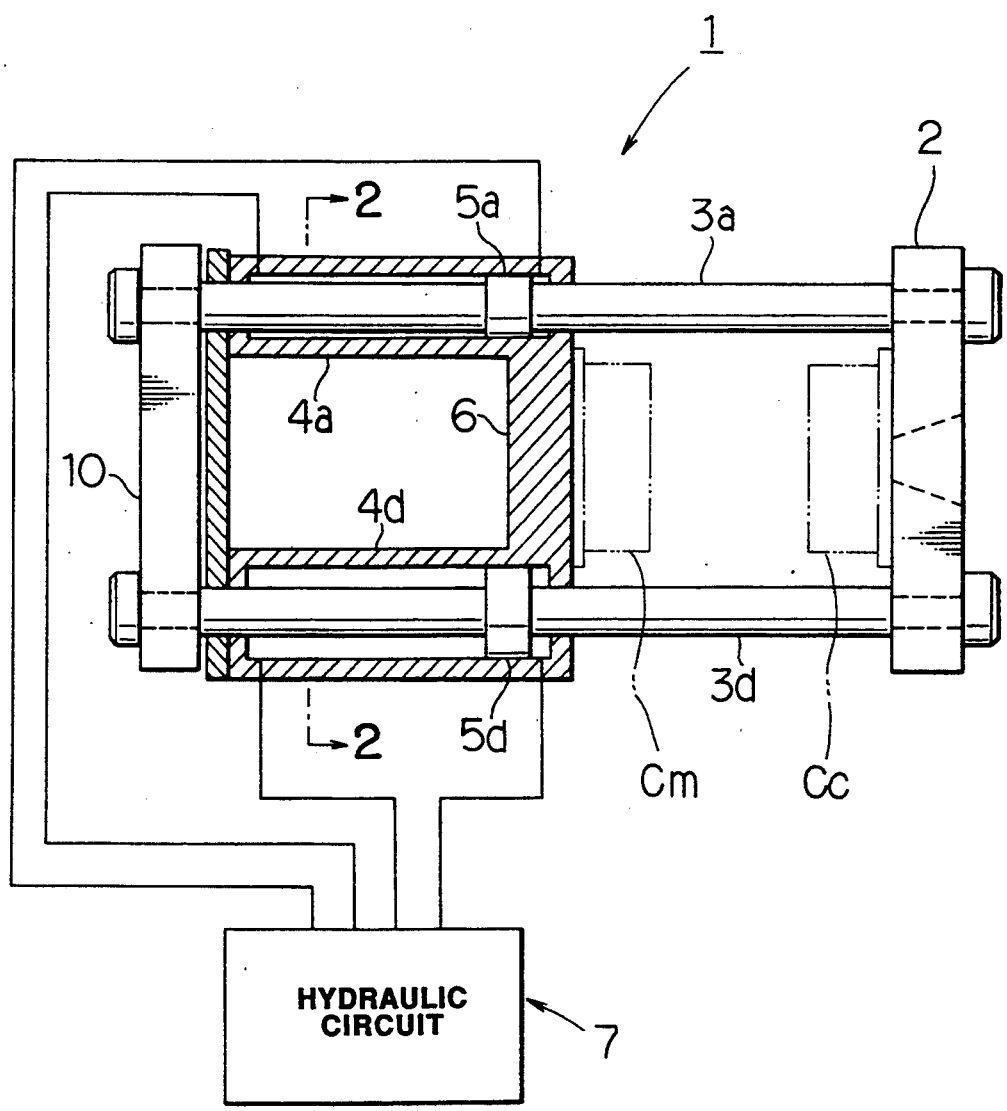
FIG. 1 is a sectional block diagram showing the main portion of the mold clamping apparatus according to the present invention.

The optimum embodiment of the present invention is described below by referring to the drawings.

First, the constitution of the mold clamping apparatus 1 of the present invention is described by referring to FIGS. 1 to 4.

For the mold clamping apparatus 1 in FIG. 1, symbol 2 is a stationary plate for supporting a fixed mold Cc shown by phantom lines, which is secured to a body which is not illustrated. While one end of each tie bar 3a, 3b, 3c, and 3d is secured to each of the four corners of the stationary plate 2, respectively, the tie bars 3a are arranged in parallel, and the other end of each tie bar is secured to the tie bar supporting plate 10.

Figure 3:
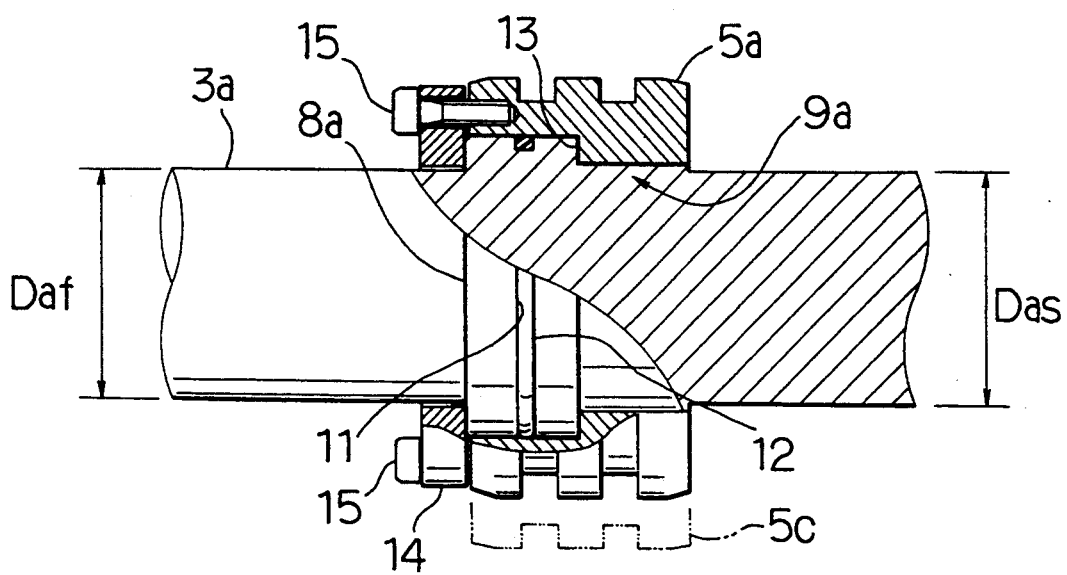
FIG. 3 is a partial sectional side view showing the piston section and a fixing state of the tie bar of the mold clamping apparatus according to the present invention.

As shown FIG. 3, the piston securing section 8a having a predetermined width and formed as a large diameter is provided at the middle of the tie bar 3a and integral with the tie bar. All portions of the tie bar 3a except the piston securing section 8a are formed round and bar like with the same diameter. That is, the diameter Daf of the tie bar 3a at the one side of the piston securing section 8a and the diameter Das of another side are made as Daf=Das. Symbol 11 is a piston-ring groove formed on the periphery of the piston securing section 8a, where O-ring 12 is fitted. Tie bars 3b–3d are formed in the same manner.

Figure 2:
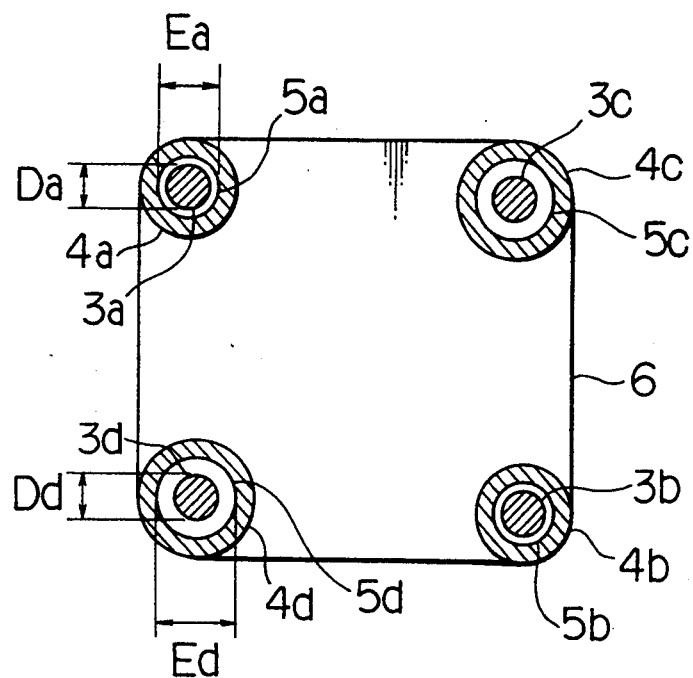
FIG. 2 is a sectional view, taken along the line 2—2 of FIG. 1.

As shown in FIG. 2, the diameter Da of the tie bar 3a and the diameter Dd of the tie bar 3d are made as Da=Dd, and other tie bars 3b and 3c are made in the same diameter. Therefore, all portions of the tie bars 3a–3d have the same diameter.

Symbols 5a, 5b, 5c, and 5d are piston sections. The piston section 5a (same for other piston sections 5b–5d) is formed as a cylinder having the hollow section 9a inside it, and a shoulder 13 is formed at the middle of the inner periphery, as shown in FIG. 3. The inside diameter at one side of the shoulder 13 is approximately equalized with the diameter of the tie bar 3a, and the inside diameter at the other side of the shoulder 13 is approximately equalized with the outside diameter of the piston securing section 8a. Thereby, the tie bar 3a can be inserted into the hollow section 9a of the piston section 5a. As shown in FIG. 3, the piston section 5a can be easily assembled with the tie bar 3a, if after by fitting the piston securing section 8a to the inner periphery of the piston section 5a, inserting the stopper ring 14 from the other side of the tie bar 3a, and securing the stopper ring 14 to the end surface of the piston section 5a by a plurality of bolts 15.

As shown in FIG. 2, the piston sections 5a and 5b (5c and 5d) of a tie bars 3a and 3b (3c and 3d) located on the diagonal line are formed in the same diameter. Adjacent tie bars, for example, 3a and 3d (3c and 3b) are formed in different diameter. That is, the diameter Ea of the piston section 5a is made smaller than the diameter Ed of the piston section 5d. The phantom line in FIG. 3 shows the position of the piston section 5c.

Symbols 4a, 4b, 4c, and 4d are cylinders accommodating the piston sections 5a, 5b, 5c, and 5d, and the cylinder are provided movably along the tie bars 3a–3d, and the cylinders 4a, 4b, 4c, and 4d are provided integrally with the moving plate 6. The moving plate 6 supports the moving mold Cm facing said stationary mold Cc. Thus, each piston section 5a–5d constitutes both rod-type pistons and a pair of front and rear oil chambers formed before and after the piston sections 5a–5d in each cylinders 4a–4d. Cylinders 4a and 4b have a small diameter and the cylinders 4c and 4d have a large diameter.

Figure 4:
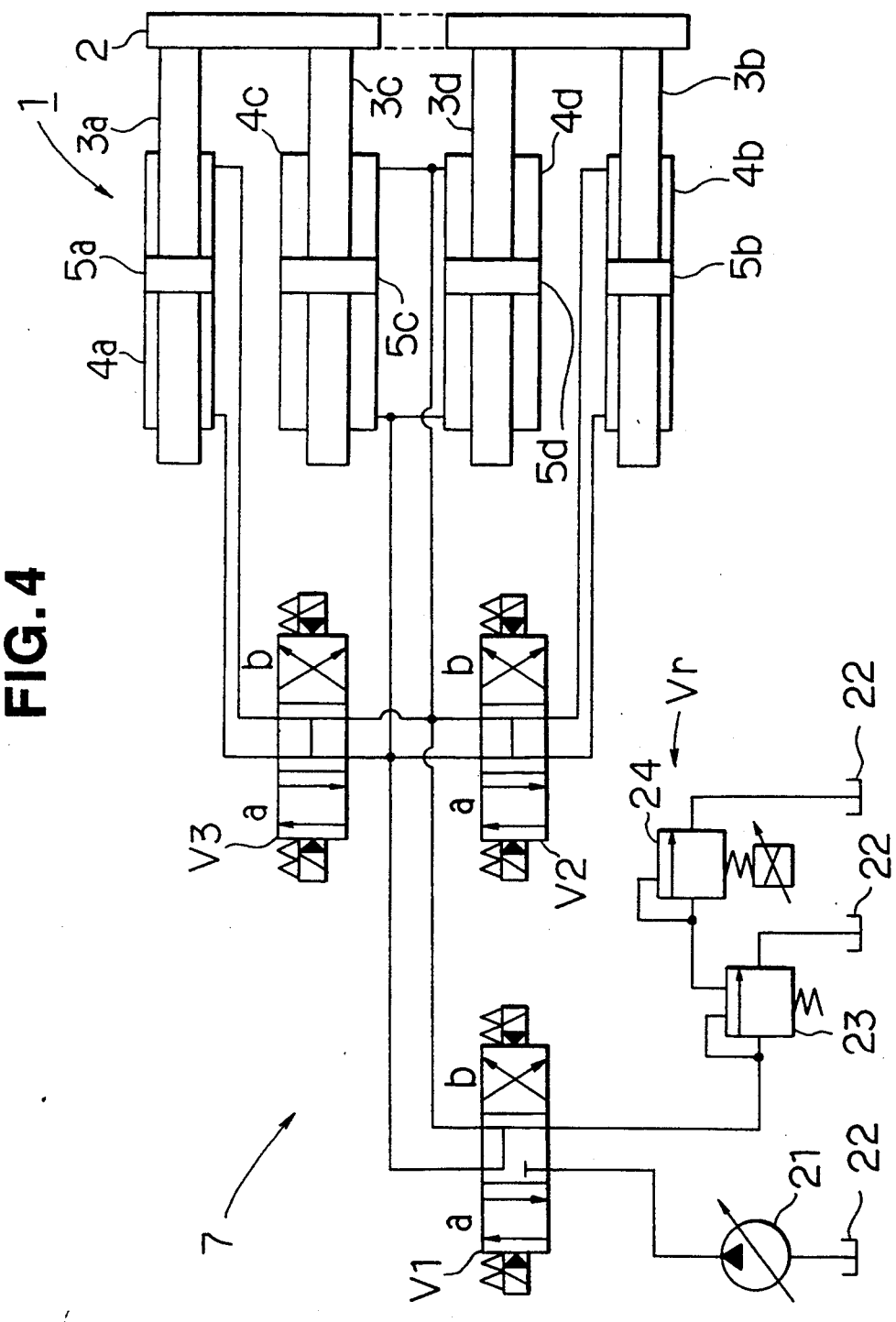
FIG. 4 is a diagram of the hydraulic circuit of the mold clamping apparatus according to the present invention.

To the oil chamber of each cylinders 4a–4d, the hydraulic circuit 7 is connected. Thereby, pressurized oil can be selectively fed to the oil chamber of cylinders 4a–4d. As shown in FIG. 4, the hydraulic circuit 7 is provided with a hydraulic pump 21, oil tank 22, four-port selector valves V1, V2, and V3, and a meter-out circuit Vr using relief valves 23 and 24, which are connected as shown in FIG. 4.

The operation of the mold clamping apparatus 1 of the present invention is explained below by referring to FIGS. 4 and 5.

For the mold clamping apparatus 1, pressurized oil is selectively fed to the oil chambers of the cylinders 4a–4d from the hydraulic pump 21 by switch-controlling the four-port selector valves V1, V2, V3, and the meter-out circuit Vr. Therefore, it is possible to perform "high-speed mold closing", "low-speed mold closing", "high-power mold closing", "high-power mold opening", "high-speed mold opening", and "low-speed mold opening". In FIG. 5, "a" or "b" shows the symbol of each of the four-port selector valves V1, V2, and V3, and "ON" represents that a valve is switched to the corresponding symbol. For the meter-out circuit Vr, "ON" represents that a predetermined pressure is applied to the return oil.

Therefore, for example, "high-speed mold closing" operates as follows. According to FIG. 5, the selector valve V1 is switched to the symbol "b" side, the selector valve V2 to the symbol "b" side, and the selector valve V3 to the symbol "b" side respectively, and the function of the meter-out circuit Vr is released. Thereby, the pressurized oil from the hydraulic pump 21 is fed to the front oil chambers of both large-diameter cylinders 4c and 4d and the return oil from the rear oil chambers of both cylinders 4c and 4d is directly returned to the oil tank 22. The pressurized oil from the hydraulic pump 21 is fed to both rear oil chambers of the small-diameter cylinders 4a and 4b and the return oil from both cylinders 4a and 4b is directly returned to the oil tank 22. As a result, the cylinders 4a–4d and the moving plate 6 move forward and high-speed mold closing is performed. Also, other modes are similarly switch-controlled according to the control matrix shown in FIG. 5.

Figure 6:
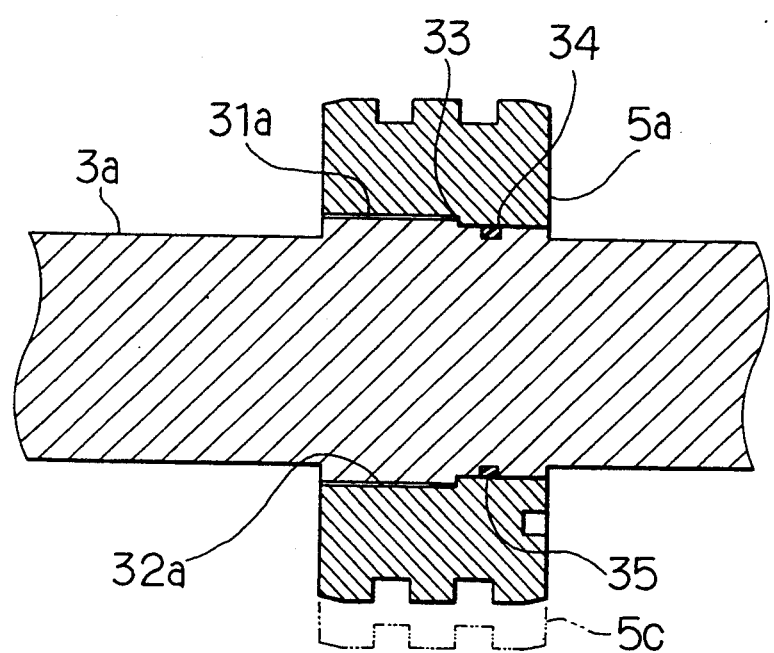
FIG. 6 is a sectional side view showing the piston section and a fixing state of the tie bar according to a modified embodiment of the present invention.

FIG. 6 shows a modified embodiment for securing the tie bar 3a and the piston section 5a. The modified embodiment is the one in which a part of the piston securing section 8a to be formed at the middle of the tie bar 3a was formed with a male screw section 31a, and it is secured by screwing in a female screw section 32a arranged on the inner periphery of the piston section 5a. In this case, to control the securing position, a shoulder 33 is formed at the middle of the inner periphery of piston section 5a and the female screw section 32a is formed only at the side having large inside diameter. Symbol 34 is an O-ring groove formed on the periphery of the piston securing section 8a where the female screw section 32a is not formed, into which an O-ring 35 is fitted.

The present invention has been described above in reference to the detailed embodiments. However, the present invention is not limited to these embodiments. For example, it is also possible to reverse the function of the moving plate and that of the stationary plate. That is, it is possible to use the moving plate of the embodiments as a stationary plate and the stationary plate of the embodiments as a moving plate.

Moreover, it is possible to optionally modify the detailed constitution, shape, quantity, and the like, as long as they do not deviate from the gist of the present invention.

I claim:

1. A method of opening and closing molds of injection molding machines wherein with respect to a mold clamping apparatus in which first ends of four tie bars formed to have an identical diameter at all positions are secured to four corners of a stationary plate for supporting a stationary mold, at middle sections of said four tie bars are provided pistons respectively in which those mutually located on diagonal lines have an identical diameter and those mutually located adjacently have different diameters, and said pistons are accommodated into four cylinders which are integral with a moving plate for supporting a moving mold respectively, whereby said moving plate is provided in a manner freely capable of movement along said tie bars, during mold closing is performed high speed mold closing in which oil pressure is supplied from a hydraulic circuit to front oil chambers of each of the cylinders accommodating the pistons having a large diameter located on the diagonal line and to rear oil chambers of each of the cylinders accommodating the pistons having a small diameter located on the diagonal line so as to close the molds due to a greater oil pressure in front oil chambers of the large diameter cylinders than in the small diameter cylinders, and during mold opening is performed high speed mold opening in which oil pressure is supplied from the hydraulic circuit to rear oil chambers of each of the cylinders accommodating the pistons having the large diameter located on the diagonal line and to the front oil chambers of each of the cylinders accommodating the pistons having the small diameter located on the other diagonal line so as to open the molds due to a greater oil pressure in the rear oil chambers of all of the large diameter cylinders than in the small diameter cylinders.

2. The method of opening and closing molds of injection molding machines according to claim 1, wherein during mold closing, supply of pressure oil to each of the cylinders is set to have the same condition as that in the high speed mold closing, and return oil from each of the cylinders is supplied to a meter-out circuit so as to perform low speed mold closing.

3. The method of opening and closing molds of injection molding machines according to claim 1, wherein during mold opening, supply of pressure oil to each of the cylinders is set to have the same condition as that in the high speed mold opening, and return oil from each of the cylinders is supplied to a meter-out circuit so as to perform low speed mold opening.

* * * * *